United States Patent
Terawaki et al.

[19]

[11] Patent Number: 5,887,122
[45] Date of Patent: *Mar. 23, 1999

[54] TRACKING CONTROL METHOD FOR ROBOT WITH WEAVING ACTION

[75] Inventors: Fumikazu Terawaki; Mitsuhiro Okuda, both of Oshino-mura, Japan

[73] Assignee: FANUC Ltd., Yamanashi, Japan

[*] Notice: This patent issued on a continued prosecution application filed under 37 CFR 1.53(d), and is subject to the twenty year patent term provisions of 35 U.S.C. 154(a)(2).

[21] Appl. No.: 572,622

[22] Filed: Dec. 14, 1995

[30] Foreign Application Priority Data

Dec. 14, 1994 [JP] Japan .................................. 6-332419

[51] Int. Cl.$^6$ .......................... B23K 9/127; G01N 21/86
[52] U.S. Cl. ................... 395/93; 395/99; 901/42; 901/46; 901/47
[58] Field of Search .......................... 395/93, 99; 901/46, 901/47, 42

[56] References Cited

U.S. PATENT DOCUMENTS

| | | |
|---|---|---|
| 4,567,347 | 1/1986 | Ito et al. .............................. 219/124.34 |
| 4,590,577 | 5/1986 | Nio et al. ..................................... 901/3 |
| 4,633,059 | 12/1986 | Sarugaku et al. .......................... 901/42 |
| 5,010,241 | 4/1991 | Butterworth ............................ 235/462 |
| 5,040,124 | 8/1991 | Okumura et al. ......................... 901/42 |
| 5,063,281 | 11/1991 | Mizuno et al. ..................... 219/125.12 |
| 5,130,515 | 7/1992 | Toyoda et al. ............................. 901/42 |
| 5,206,474 | 4/1993 | Fukuoka et al. .................... 219/124.34 |
| 5,250,783 | 10/1993 | Nishi et al. ......................... 219/121.64 |
| 5,362,970 | 11/1994 | Pryor et al. ............................... 250/561 |
| 5,399,870 | 3/1995 | Torii et al. ................................ 250/561 |
| 5,495,090 | 2/1996 | Mukai et al. .............................. 901/42 |
| 5,546,179 | 8/1996 | Cheng ........................................ 356/73 |
| 5,582,750 | 12/1996 | Hamura et al. ........................... 901/42 |
| 5,597,498 | 1/1997 | Sunayama et al. ................ 219/124.34 |

FOREIGN PATENT DOCUMENTS

| | | |
|---|---|---|
| 4-190977 | 7/1992 | Japan . |
| 5-26619 | of 1993 | Japan . |

*Primary Examiner*—George B. Davis
*Attorney, Agent, or Firm*—Staas & Halsey

[57] ABSTRACT

A method of controlling a robot to perform a weaving action and a tracking action using a non-contact sensor. When a weaving start command with a condition of a cycle Tw is issued, a laser sensor starts scanning in a cycle Tw/2n in synchronism with the start of weaving action, and outputs sensor data for every scanning time to be stored in a memory. After starting the weaving action, the robot performs a weaving action with a welding line as a reference path, until the tool reaches the weaving extreme (Sm, Sn+m, S2n+m, . . . ) or the termination of the weaving according to the weaving condition. Since a timed relationship between the weaving action and the scanning action of the laser sensor is known, the robot position corresponding to detection data can be calculated, based on which it is possible to successively determine a target position of the robot movement by adding a weaving amount for each detection point. The weaving action is synchronized with the scanning of the laser sensor every time the robot reaches the position of the weaving extreme Sm, Sn+m, . . . to pause and the weaving action is continued tracing the welding line as a reference path.

8 Claims, 7 Drawing Sheets

FIG. 2

| [CONDITION] | FREQUENCY(Hz) | AMPLITUDE(mm) | LEFT-EXTREME TIMER (sec) | RIGHT-EXTREME TIMER (sec) |
|---|---|---|---|---|
| 1. | 1.0 | 5 | 0.3 | 0.3 |
| 2. | 1.5 | 7 | 0.3 | 0.3 |
| 3. | 2.0 | 10 | 0.3 | 0.3 |
| 4. | 1.0 | 7 | 0.5 | 0.5 |
| 5. | 1.5 | 10 | 0.5 | 0.5 |
| 6. | 2.0 | 13 | 0.5 | 0.5 |

TRACKING CONTROL METHOD FOR ROBOT WITH WEAVING ACTION

BACKGROUND OF THE INVENTION

1. Field of the Invention

The present invention relates to a method of controlling an industrial robot such as a welding robot, and more particularly to a method of controlling the robot to perform a weaving action while tracking an operation line using a non-contact sensor such as a laser sensor.

2. Description of the Related Art

Known in the related art of robot control technology is a tracking method using a non-contact sensor. In this method, a position of an operation line such as a welding line is successively detected by the non-contact sensor such as a laser sensor, mounted on the robot for sensing an advanced region of a tool in a moving direction of the tool during a play-back operation of an operation program. In addition, a taught path is corrected according to the result of the detection received from the non-contact sensor. The non-contact sensor is hereinafter represented by the laser sensor.

The above tracking control method by correcting the taught path using a laser sensor enables the robot to trace the operation line detected by the laser sensor even if an object of operation (workpiece) is not precisely positioned, to provide a very useful technology to a welding robot, etc.

On the other hand, in a welding robot, etc., a control method for performing a weaving action of periodically displacing the tool from a predetermined reference path is widely adopted. The conventional weaving action is performed by employing the taught path as a reference path. However, in a case where an actual welding line is possibly deviated from the taught path, it is desirable to perform the weaving action by employing a welding line considerably deviated from the taught path as the reference path.

In tracking the welding line using a laser sensor, so as to obtain a tracking target point (a crossing point of the scanning locus and the welding line) in a robot coordinate system set to the robot (e.g. a base coordinate system set to a base of the robot) on the basis of the detection data from the laser sensor, it is necessary to determine a robot position at each time of the scanning periodically performed by the laser sensor.

In tracking without the weaving action, as the robot position at each time of scanning by the laser sensor can be definitely calculated from the position data of the taught path and the detection data from the sensor, it is possible to control the robot by successively determining a tracking target point.

However, when the robot is controlled to perform the weaving action, the robot position at each scanning time would be largely changed due to the displacement amount (weaving amount) added for the weaving action. Therefore, unless the weaving amount at each scanning time is calculable, already known or constant, it is impossible to control the robot to perform the weaving action while tracking the welding line as a reference line of the weaving. In the conventional art, since an accurate displacement amount for the weaving at each scanning of the laser sensor could not be obtained, it was difficult to realize the tracking with the weaving action.

SUMMARY OF THE INVENTION

An object of the present invention is to control a robot to perform a weaving action while tracking a predetermined operation line (e.g., a welding line in welding operation) in a superposed manner, to improve quality of a welding operation.

The present invention provides a method of controlling a robot to perform a weaving action of periodically displacing from an operation line while tracking the operation line using a non-contact sensor. The non-contact sensor senses an advanced region of a tool mounted on the robot in a moving direction of the tool.

The robot control method of the present invention periodically detects a position of the operation line by the non-contact sensor during a play-back operation of an operation program and obtains a detection data representing the position of the operation line in a sensor coordinate system set to the non-contact sensor. The method of the present invention obtains a first weaving amount of the tool from the operation line at each sensing time in accordance with a predetermined condition, sets a cycle of the weaving action to a value obtained by multiplying a cycle of the sensing of the non-contact sensor by an integer number.

The method of the present invention synchronizes the sensing of the non-contact sensor with the weaving action, successively determines a position of the operation line in a robot coordinate system set to the robot using the first weaving amount and the detection data of the sensor, determines a second weaving amount for the position of the operation line in accordance with the predetermined condition, obtains a target point of movement in the robot coordinate system, using the second weaving amount and the position of the operation line in the robot coordinate system, and moves the tool toward the target point.

Synchronization of the weaving action with the sensing action by the non-contact sensor can be carried out at extremes of the weaving action.

A typical non-contact sensor to be used in the present invention is a laser sensor. When adopting the laser sensor as a non-contact sensor, the sensing cycle is a scanning cycle of the laser sensor. Thus, the scanning cycle of the laser sensor is controlled to coordinate with the cycle of the weaving action.

A welding operation to be performed by a welding robot is a typical example of the robot operation in which the control method adopting a laser sensor as the non-contact sensor is effective. When the present invention is applied to a welding robot with the laser sensor, the operation line sensed by the laser sensor is a welding line defined by a peripheral edge of the workpiece, or an abutment of two workpieces. In this case, the sensing cycle is a scanning cycle in which a laser beam of the laser sensor crosses the welding line.

BRIEF DESCRIPTION OF THE DRAWINGS

FIG. 2 shows an example of a table or setting a weaving condition, which is displayed on a liquid crystal display associated with a teaching operation panel of a robot controller of the present invention;

DETAILED DESCRIPTION OF THE PREFERRED EMBODIMENT

The principle of a tracking control method of the invention will be described with respect to a welding robot using a laser sensor as a non-contact sensor.

Figure 1:
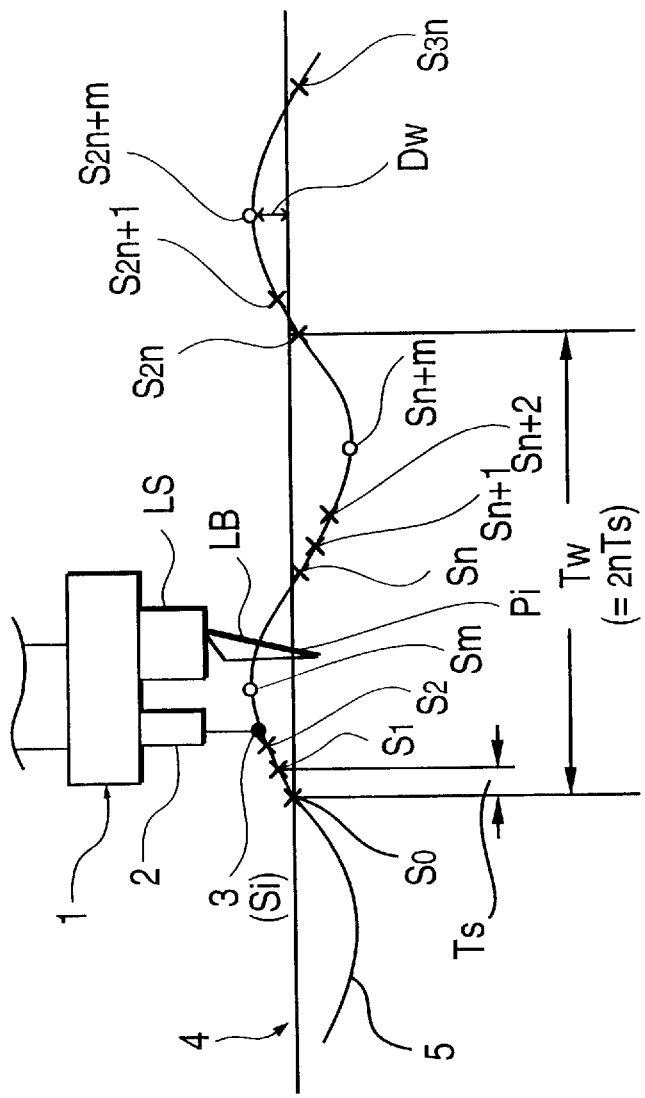
FIG. 1 is a schematic diagram showing an arrangement in which a welding robot performs a weaving action while tracking a welding line, and a relationship between a weaving cycle and a scanning cycle (sensing cycle) according to the present invention.

In FIG. 1, a straight welding line 4 is shown. Welding is performed by a welding torch 2 attached to an end portion 1 of a robot arm via an appropriate mounting mechanism. Reference numeral 3 designates a tool point of the robot, which is set at an end position of the welding torch 2. The position of the robot is represented by the position of the tool point 3.

A laser sensor LS is mounted on the arm end 1 of the robot alongside of the welding torch 2 and a laser beam LB is radiated to effect a deflection scanning across the welding line 4.

If the robot performs only a tracking action without weaving, a moving path of the robot substantially coincides with the welding line 4. If the robot performs a weaving welding according to the method of the invention, the tool point 3 of the robot moves along a path 5 periodically displaced from the welding line 4 which serves as a reference line. In this illustrated example, a simple sine curve locus is selected among various kinds of weaving loci.

According to the invention, a scanning cycle Ts of the laser sensor LS is set to coordinate with a weaving cycle Tw. Specifically, the relationship between the scanning cycle Ts of the laser sensor LS and the weaving cycle Tw is expressed as Tw=N·Ts. Generally, it is required that N is an integer and when N is set to be an even number (N=2n; n is an integer), Tw=2·Ts.

By setting the sensing cycle of the laser sensor in this manner, a phase of the weaving action of the tool point 3 is determined at each scanning time. Namely, at extremes (a position where the weaving amount is 0 and a position where the weaving amount is maximal) in one cycle of the weaving action, the scanning action of the laser sensor is synchronized with the weaving action.

In FIG. 1, the position of the tool point 3 at each scanning time of the laser sensor LS is represented by S0, S1, S2, ..., Sm, ..., Si, ..., Sn, Sn+1, Sn+2, Sn+m, ..., S2n, ..., where n is an even number (n=2m; m is an integer). In each position where the weaving extent is 0 and each position where the weaving extent is maximal, the scanning action of the laser sensor is synchronized with the weaving action.

Thus, when the tool point 3 reaches each of the positions S0, Sn, S2n, ..., the scanning is performed at an equivalent phase position in the weaving action in accordance with the relationship between the sensing cycle and the weaving cycle. Likewise, the scanning in each of the positions Sm, Sn+m, S2n+m, ... is performed at an equivalent phase position in the weaving action. As long as the weaving condition is not altered, the weaving amounts at these equivalent phase positions are the same. Accordingly, the weaving amount at each scanning time can be calculated using a set weaving condition. If the weaving amount at each scanning time is obtained, the robot position at each scanning time can be calculated and thus it is made possible to calculate the position of a detected point Pi of the welding line 4 on the robot coordinate system, which is obtained by the scanning when the tool center point 3 is in the position Si.

If the position on the robot coordinate system corresponding to the detected point Pi on the sensor coordinate system for each scanning is obtained, it is possible to successively determine a target position of the robot movement by adding the weaving amount for the detected point Pi to the coordinate value of the detected point Pi as a reference position.

Thus, for an operation in which a deviation is supposed between the taught path and the actual operation line, it is made possible to perform the tracking with weaving. Particularly in a welding robot with a laser sensor, since the weaving welding is performed while tracking the welding line as a reference line, the weaving locus is prevented from being diverged from the welding line, although there is a considerable deviation between the taught path and the actual operation line, thus improving the quality of welding bead.

An embodiment of the present invention will be described for performing the weaving welding in accordance with the arrangement and weaving locus as shown in FIG. 1.

Figure 3:
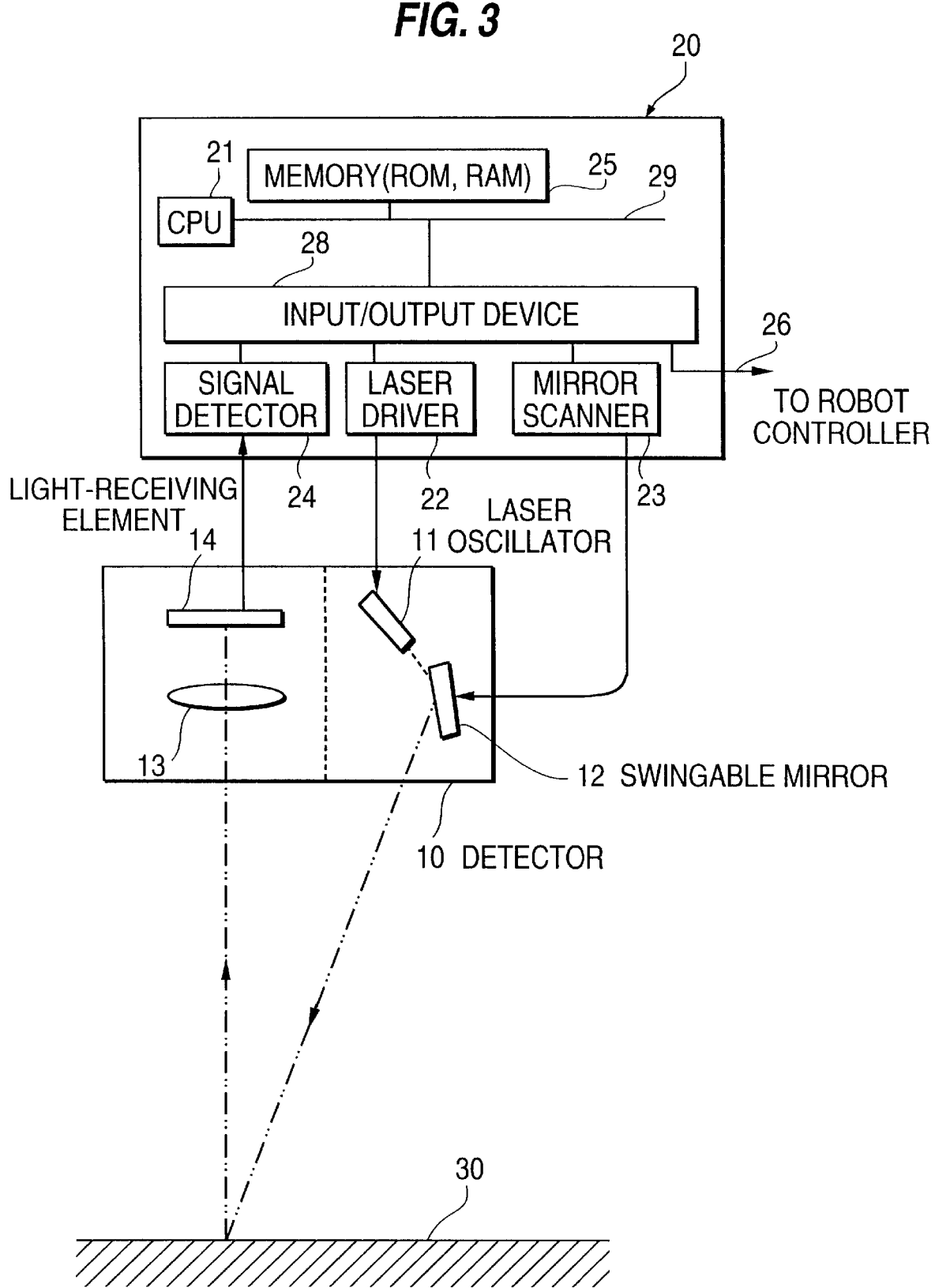
FIG. 3 is a schematic diagram showing an arrangement of a laser sensor mounted on the robot of the present invention.

FIG. 3 shows a general structure of the laser sensor LS mounted on the robot 1 (arm end) of FIG. 1. In FIG. 1, a detecting section 10 comprises a laser oscillator 11, a swingable mirror (galvanometer) 12 for making a laser beam scan, and an optical system 13 for catching the reflected light to form an image on a light-receiving element 14. A control section 20 constituting a sensor board has a CPU 21 in the form of a microprocessor, to which an input-output device 28 and memory 25 including ROM/RAM are connected via a bus 29.

Figure 5:
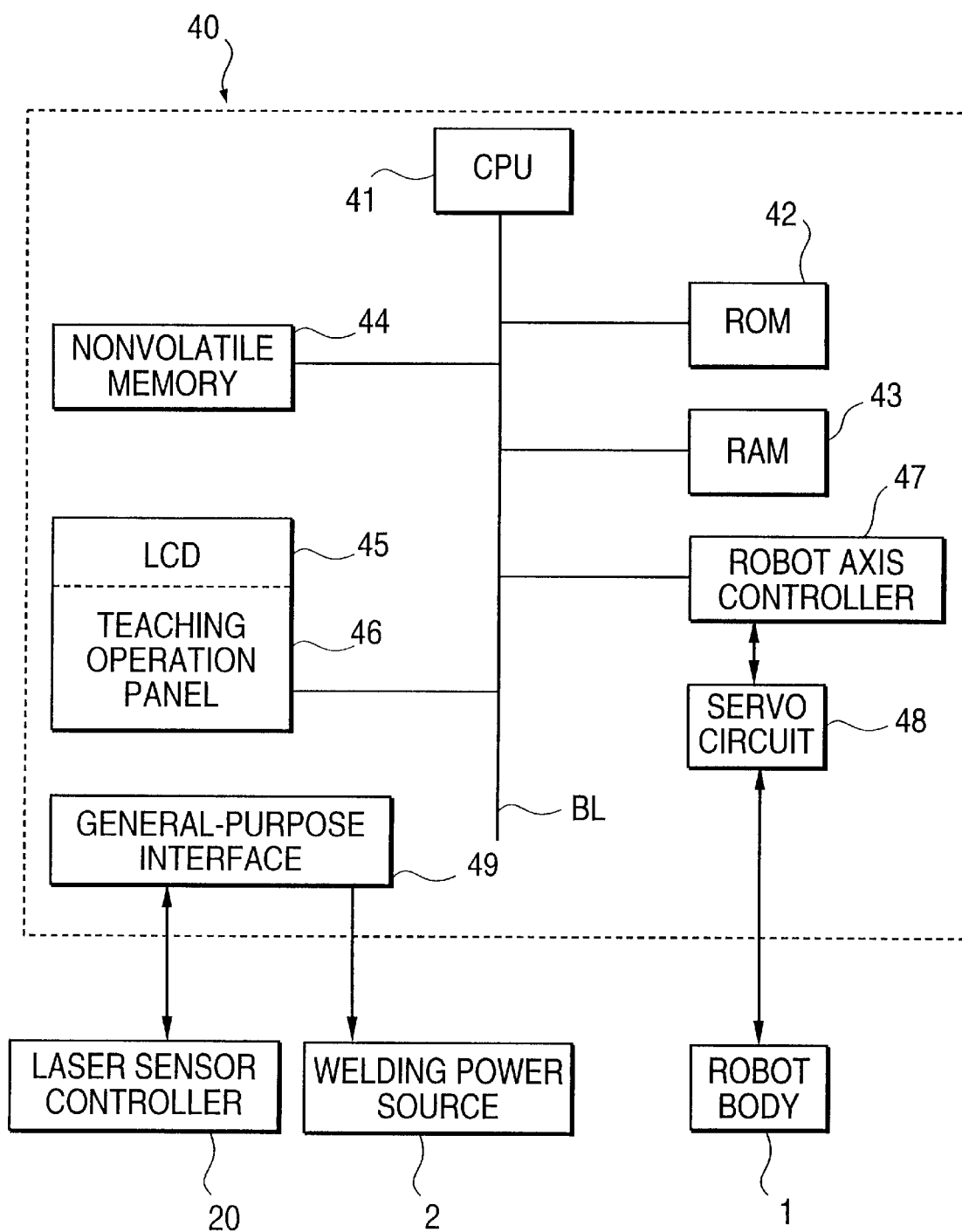
FIG. 5 is a block diagram of a whole system to be used for carrying out the method of the present invention.

A laser driver 22 for driving the laser oscillator 11 to generate a laser beam, a mirror driver 23 for swinging the swingable mirror 12 and a signal detector 24 for detecting a position of an object based on the position at which the laser beam is received by the light-receiving element 14 are connected to the input-output device 28. The input-output device 28 is connected to a line 26 for transferring various commands and data to a robot controller (FIG. 5).

Upon receipt of a laser sensor start command from the robot controller, a laser sensor driving program stored in the memory 25 is started, and the CPU 21 sends a laser drive command to the laser driver 22 so that the laser oscillator 11 is driven to generate a laser beam. The CPU 21 also sends a mirror scanning command to the mirror driver 23 to swing the swingable mirror 12 so that the laser beam from the laser oscillator 11 scans an object 30.

The laser beam diffused and reflected on the object 30 forms an image on the light-receiving element 14 at a position in dependence on the position of reflection on the object. The light receiving element 14 may be a CCD (Charge Coupled Device) which is a split-type element or a PSD (Position Sensitive Detector) which is a nonsplit-type integrating element.

In the embodiment, a one-dimensional CCD array of the laser sensor is used as the light-receiving element 14. The light (an image of the light spot) struck upon the light-receiving surface of the light-receiving element 14 is converted into optoelectrons and display in its cells. The electric charges stored in the cells are outputted successively from the utmost cell at every predetermined cycle in accordance with the CCD scan signals from the signal detector 24, and newest data is stored in the memory 25 via the signal detector 24 and the input-output device 28 as processed by analog-to-digital conversion.

The scanning cycle of CCD is set to be adequately shorter (e.g., a several-hundredth) than the scanning cycle of the swingable mirror 12, and any change both in an angle of the swingable mirror 12 and in an output status of the CCD element can be grasped at any time. The output status of the CCD element is grasped in terms of cell position (cell number) of the maximum-output so that the cell position at which the reflected light struck can be detected. Based on the detected position, the position of the object 30 in the sensor coordinate system is calculated.

Figure 4:
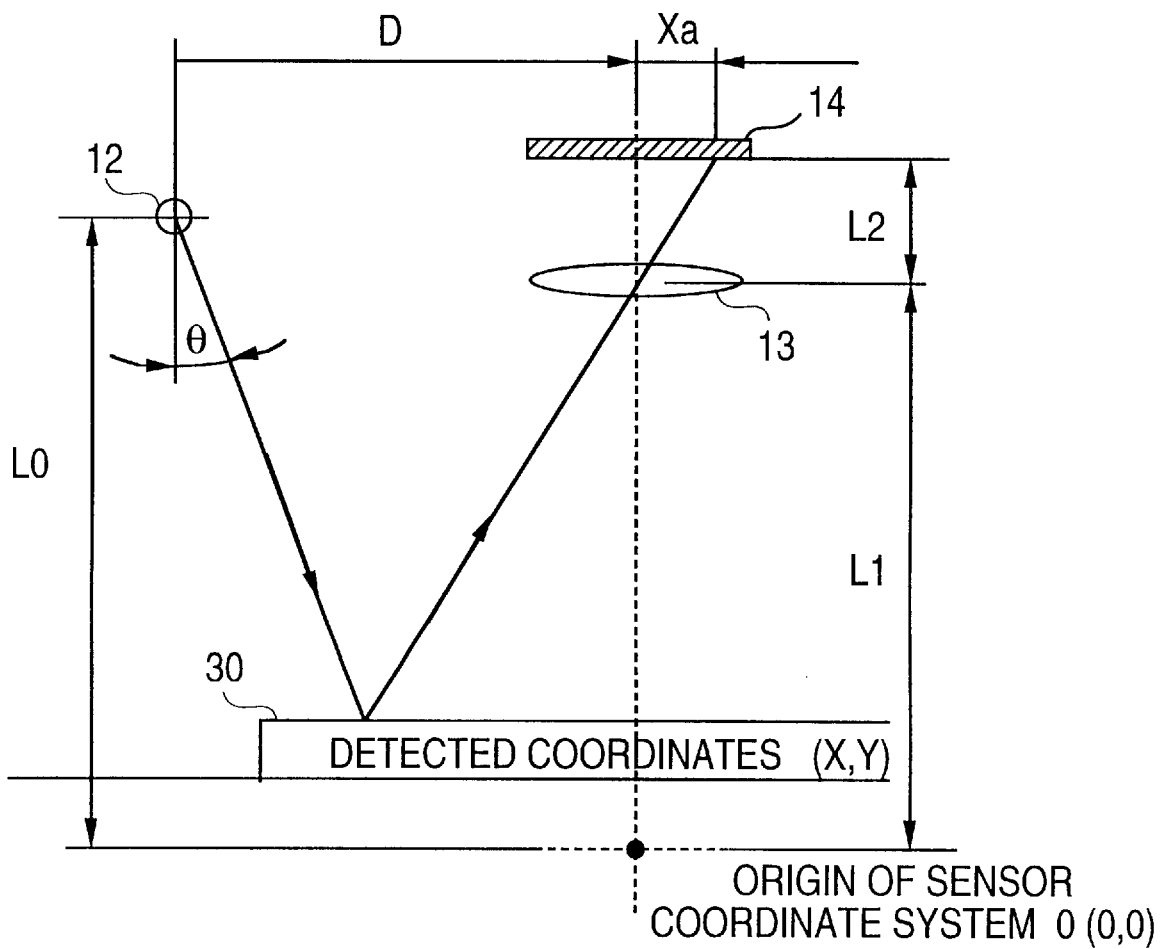
FIG. 4 is a diagram illustrating a way of obtaining a coordinate position of an object in a sensor coordinate system based on a position of an image on a light-receiving element of the laser sensor.

FIG. 4 is a diagram for explaining a way of obtaining a coordinate position (X, Y) of the object 30 in the sensor coordinate system based on the position xa of the image detected by the light-receiving element 14. An origin O (0, 0) of the sensor is defined on a straight line connecting a center of the optical system 13 and a central point of the light-receiving element 14, and this straight line is defined to be a Y axis while the straight line perpendicular to the Y axis is defined to be a X axis. L1 represents a distance between the origin O and the center of the optical system 13, L2 represents a distance between the center of the optical system 13 and the central point of the light-receiving element 14, D represents a distance between the origin O and a center of angular movement of the swingable mirror 14 in the direction of the X axis, L0 represents a distance between the origin 0 and the center of angular movement of the swingable mirror 14 in the direction of the Y axis, θ represents an angle between the Y axis and the laser beam reflected on the swingable mirror 14, and xa represents a position at which the light-receiving element 14 receives the reflected light. Using the symbols as defined above, the coordinate position (X, Y) at which the laser beam strikes and is reflected on the object is obtained by the following equations (1) and (2).

$$Y = L2\{L0 \cdot \tan\theta + xa(L1/L2) - D\}/(xa + L2 \cdot \tan\theta) \quad (2)$$
$$= \{L1 \cdot xa + L2(L0 \cdot \tan\theta - D)\}/(xa + L2 \cdot \tan\theta)$$

The CPU 21 of the control section 20 starts a position calculating program stored in the memory 25 in response to a command from the robot controller to execute a processing corresponding to the calculation of the equations (1) and (2) at a predetermined period. The result of the calculation is transferred to the robot controller. The data transferred to the robot controller is used in calculating a three-dimensional position of the reflected position together with the position data of the robot, as described below.

The position of the welding line calculated based on the detection output of the laser sensor is utilized in tracking action of the robot. In the present invention, since tracking and weaving are simultaneously performed, the welding line is not a target path for the robot movement but serves as a reference path for the weaving action. action. Thus, the position of the welding line calculated from the detection output of the laser sensor is not directly adopted as the target position for the robot movement but the target position is determined by adding a deviation amount corresponding to the necessary weaving amount (displacement amount from the reference path) for each detected position of the welding line.

The necessary weaving amount for each detected point is calculated using data of a predetermined weaving condition. FIG. 2 shows an example of a display displayed for setting the weaving condition on the liquid crystal display device associated with the teaching operation panel of the robot controller (FIG. 5).

In FIG. 2, numbers 1–9 at the leftmost column are respectively allotted to set conditions, and the contents of the set conditions of each number are inputted by the operator, so that the contents of the condition number designated in a robot moving program becomes valid. A frequency f (an inverse number of cycle Tw; f=1/Tw) and an amplitude Dw (FIG. 1) of the weaving action are included in the set conditions. A time period to pause at each extreme of the weaving locus (corresponding to the positions indicated by Sn+m, S2n+m, . . . in FIG. 1) can be set as desired. These pauses are useful in synchronizing the weaving action with the scanning action of the laser sensor LS at each extreme of the weaving locus.

Referring to FIG. 5, the arrangement of the whole system to be used for carrying out the invention will be described, focusing on the robot controller.

The robot controller 40 has a central processing unit (CPU) 41, to which a memory 42 in the form of ROM, a memory 43 in the form of RAM, a nonvolatile memory 44, a teaching operation panel 46 with a liquid crystal display device 45, a robot axis control section 47 connected to a welding robot body 1 via a servo circuit 48, and a general-purpose interface 49 connected to both a control section 20 (FIG. 1) for the laser sensor LS and a welding power source 2' are connected via a bus line BL.

In the ROM 42, various programs for controlling the laser sensor control section 20, the welding power source 2' and the robot controller 40 are stored. The RAM 43 is a memory for use in temporary storage and calculation of data. In the nonvolatile memory 44, set values of various parameters and the robot moving program are input and stored.

Figure 6:
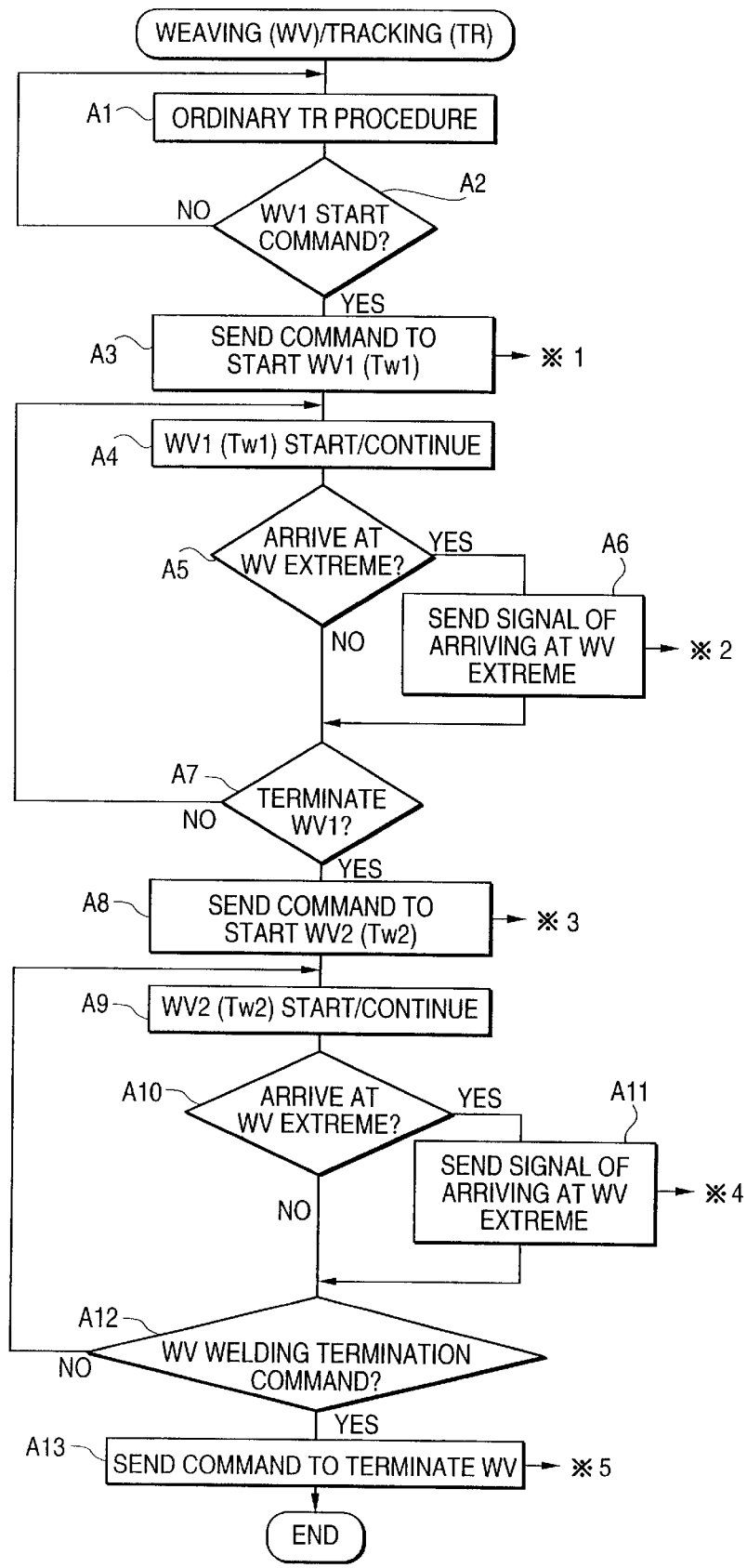
FIG. 6 is a flowchart of processing to be executed by the robot controller for performing the weaving and tracking according to the present invention.
Figure 7:
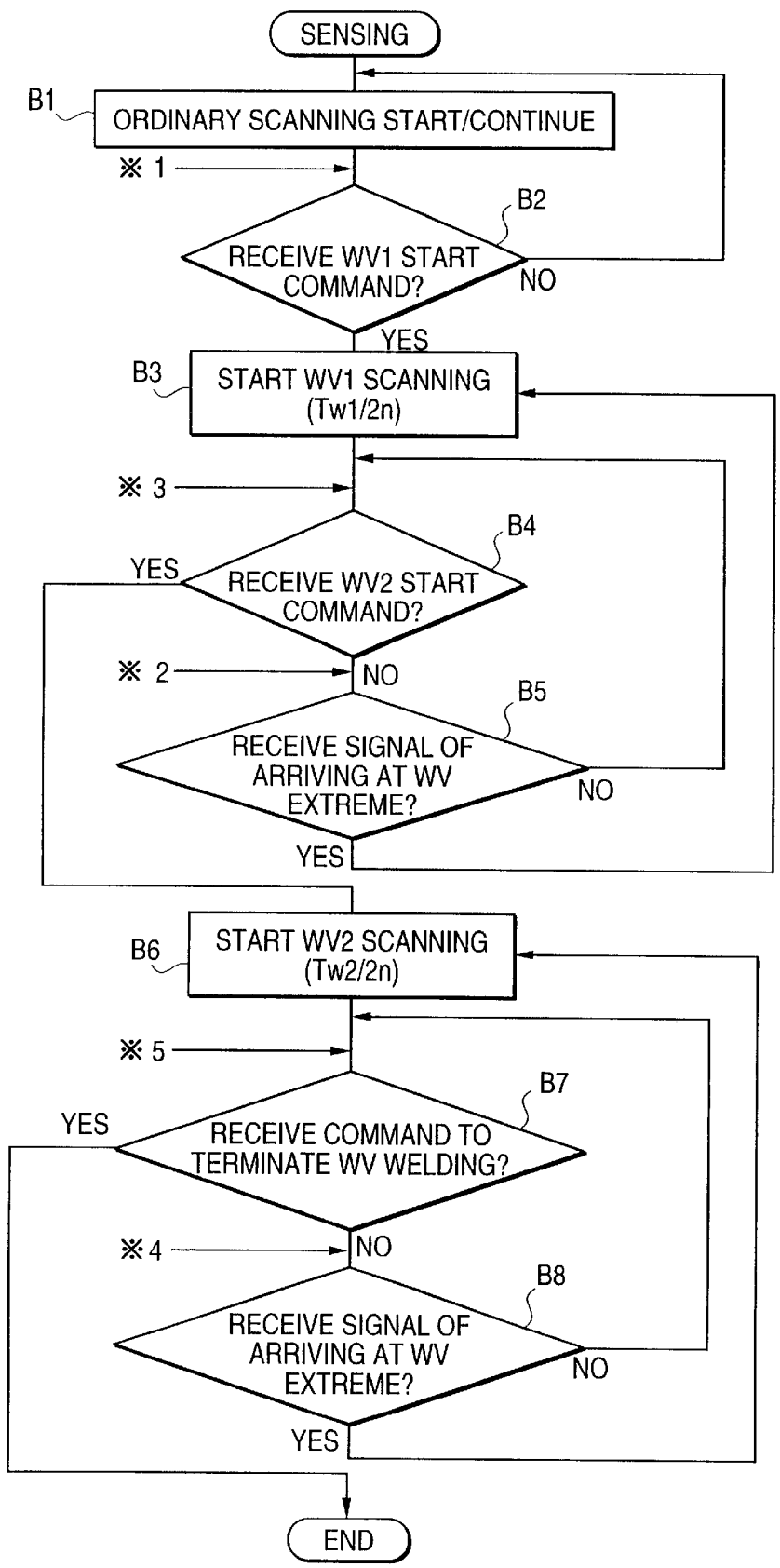
FIG. 7 is a flowchart of processing to be executed by the laser sensor controller for performing the weaving and tracking according to the present invention.

With the above arrangement, the procedure for the robot to perform tracking with weaving is described referring to the flowcharts of FIGS. 6 (weaving/tracking) and 7 (sensing). In these flowcharts, symbol WV represents weaving and TR represents tracking. With respect to the weaving conditions shown in FIG. 2, it is assumed in the following example that the condition 1 and the condition 2 are designated in this order in the robot moving program. It is also assumed that shortly after the start of the procedure, the robot performs ordinary tracking action, then starts the weaving action under the condition No. 1 and then changes the weaving condition to No. 2, and terminates the weaving action to finish the movement (welding operation) of the robot.

The procedure for the robot and the procedure for the laser sensor starts substantially simultaneously. The laser sensor starts sensing by the laser scanning and waits for a weaving start command (steps B1, B2). On the other hand, the robot performs the tracking action using the output of the laser sensor and the robot position data, until a weaving start command under the condition No. 1 is issued (steps A1, A2).

The issued weaving start command for the condition No. 1 is sent together with the conditions such as a weaving cycle Tw1 (1.0 second in FIG. 2) to the laser sensor (step A3). Upon receipt of the command and the condition data, the laser sensor starts scanning in a cycle Tw1/2n (n is set an appropriately large even number in this embodiment) synchronized with the start of the weaving action. The laser sensor outputs sensor data at each scanning time and the sensor data are stored in the memory (step B3).

The robot starts the weaving action synchronized with the scanning of the laser sensor at step A4 and continues the weaving action with the detected welding line as a reference path by successively determining target points of the robot movement based on the sensor data and the weaving amount (calculated as offset data from the welding line in a separate processing by the CPU 41). This weaving action continues until the robot reaches the weaving extreme (i.e., the position Sm, Sn+m, S2n+m, ... in FIG. 1) or until a command for terminating the weaving action under condition 1 is issued (steps A5, A7).

For obtaining data representing the position of the welding line in the robot coordinate system, based on the detection data obtained by the laser sensor in the sensor coordinate system, it is necessary to determine the robot position at the scanning time when the detection data is obtained. According to the present invention, unlike the conventional art, since the relationship between the weaving cycle and the scanning cycle of the laser sensor is known and the weaving action is started synchronized with the scanning action, the weaving amount (offset amount from the welding line) can be calculated at each scanning time by the robot controller based on the times of scanning in which the sensor data are obtained.

Thus, it is possible to calculate a robot position at each scanning time at which each corresponding sensor data is obtained, and a target position for the robot movement can be determined one after another by adding respective weaving amount for the respective position of the detected point to the respective position based on the robot position at each scanning time.

After the scanning action is started in accordance with the weaving condition 1 at step B3, the scanning action continues until the laser sensor receives a command notifying that the robot has reached the weaving extreme, or a command to terminate the weaving action under condition 1 and start the weaving action under condition 2 (steps B4, B5; e.g., S0, S1, ... Sm in FIG. 1). The weaving condition is changed while the robot is temporarily stopped at a position where the synchronous start of the scanning and weaving is not affected, namely, at the extreme of weaving (or the robot may be temporarily stopped when offset amount is 0 to enable the synchronous start).

When the robot reaches the weaving extreme (e.g., the position Sm in FIG. 1), the processing proceeds from step A5 to step A7 so that a signal indicating the arrival at the weaving extreme is transmitted to the laser sensor. Upon receipt of this signal, the processing of the CPU 21 of the laser sensor returns from step B5 to step B3 to synchronize with scanning and weaving. Subsequently, the robot performs the weaving action through the extremes in which the same processing is carried out as mentioned above.

After a while, when a command is issued to terminate the weaving action under the condition 1 and start the weaving action under the condition 2 in which the weaving cycle Tw2 is set (1.5 seconds in the example of FIG. 5), the processing proceeds from step A7 to step A8 so that a command to start the weaving action under the condition 2 is sent to the CPU 21 of the laser sensor. In response to receipt of the command, the processing proceeds from step B4 to step B6 in which the scanning action of a cycle Tw2/2n is started synchronized with the weaving action and the sensor data is outputted at each scanning time for storage in the memory.

Having started the weaving action under condition 2 in synchronism with the scanning of the laser sensor at step A9, the robot controller successively determines a target point of the robot movement and the robot performs a weaving action with the welding line as a reference path (steps A10, A12), based on the sensor data and the weaving amount in the similar manner as in the condition 1. The weaving action continues until the robot reaches the weaving extreme or a command to terminate the weaving under condition 2 is issued.

After the scanning action in accordance with the condition 2 is started at step B6, the laser sensor continues scanning action until a signal indicating that the robot has reached the weaving extreme, or a command to terminate the weaving action under the condition 2 (i.e., to terminate the weaving welding) is issued (steps B7, B8).

The robot performs the weaving action under the condition 2, when a command to terminate the weaving under the condition 2 is issued, the processing proceeds from step A12 to step A13 where the same command is sent to the laser sensor. The CPU 21 of the laser sensor detects this command at step B7 to terminate the scanning action.

In the foregoing embodiment, a description is supplied with respect to a welding robot having a laser sensor as a non-contact sensor. Alternatively, the non-contact sensor may be a visual sensor using a CCD camera. In such event, control is made so that a cycle of fetching an image from a camera of the visual sensor coordinates with the weaving cycle, and synchronization of the image fetching with the weaving action is carried out at the weaving extreme. The kind of operation of the robot should not be limited to welding, and the present invention is also useful when applied to any other operation requiring a weaving action and a tracking action (e.g., painting or sealing).

According to the invention, a tracking action can be carried out with a weaving action. Thus, in such an operation that a deviation is anticipated between the taught path and the actual operation line, the tracking of the actual operation line can be performed with the weaving action. When the present invention is applied to a welding robot carrying a laser sensor, a weaving welding is performed while the robot is tracking the welding line as a reference line, and thus the weaving locus is prevented from being unintendedly diverged from the welding line to improve the quality of welding bead, although there is a considerable deviation between the taught path and the actual welding line.

What is claimed is:

1. A method of controlling a robot to perform a weaving action of periodically displacing from an operation line while tracking the operation line using a non-contact sensor for sensing an advanced region of a tool mounted on said robot in a moving direction of the tool, said method comprising the steps of:

(a) periodically detecting a position of said operation line by said non-contact sensor during a playback operation of an operation program and obtaining a detection data representing the position of said operation line in a sensor coordinate system set to said non-contact sensor;

(b) obtaining a first weaving amount of said tool from said operation line at each sensing time in said step (a) in accordance with a predetermined condition, a cycle of said weaving action being set to a value obtained by multiplying a cycle of said sensing of said non-contact sensor by an integer number, the sensing of said non-contact sensor being synchronized with said weaving action;

(c) successively determining a position of said operation line in a robot coordinate system set to said robot using said first weaving amount obtained in said step (b) and said detection data obtained in said step (a);

(d) determining a second weaving amount for said position of said operation line determined in said step (c) in accordance with the predetermined condition;

(e) obtaining a target point of movement in said robot coordinate system, using said second weaving amount obtained in said step (d) and said position of said operation line obtained in said step (c); and (f) moving the tool toward said target point obtained in said step (e).

2. A method of controlling a robot according to claim 1, wherein said non-contact sensor comprises a laser sensor and said sensing cycle is a scanning cycle of said laser sensor.

3. A method of controlling a robot according to claim 1, wherein said robot comprises a welding robot, said operation line comprises a welding line, said non-contact comprises a laser sensor and said sensing cycle is a scanning cycle of said laser sensor.

4. A method of controlling a robot to perform a weaving action of periodically displacing from an operation line while tracking the operation line using a non-contact type sensor for sensing an advanced region of a tool mounted on said robot in a moving direction of the tool, said method comprising the steps of:

(a) periodically detecting a position of said operation line by said non-contact sensor during a playback operation of an operation program and obtaining a detection data representing the position of said operation line in a sensor coordinate system set to said non-contact sensor;

(b) obtaining a first weaving amount of said tool from said operation line at each sensing time in said step (a) in accordance with a predetermined condition, a cycle of said weaving action being set to a value obtained by multiplying a cycle of said sensing of said non-contact sensor by an integer number;

(c) synchronizing the weaving action with the sensing action of said non-contact sensor in a position where the weaving amount from said operation line is maximal in the weaving action;

(d) successively determining a position of said operation line in a robot coordinate system set to said robot using said first weaving amount obtained in said step (b) and said detection data obtained in said step (a);

(e) determining a second weaving amount for said position of said operation line determined in said step (d) in accordance with the predetermined condition;

(f) obtaining a target point of movement in said robot coordinate system, using said second weaving amount obtained in said step (e) and said position of said operation line obtained in said step (d); and (g) moving the tool toward said target point obtained in said step (f).

5. A robot controlling method according to claim 4, wherein said non-contact sensor comprises a laser sensor and said sensing cycle is a scanning cycle of said laser sensor.

6. A method of controlling a robot according to claim 4, wherein said robot comprises a welding robot, said operation line comprises a welding line, said non-contact comprises a laser sensor and said sensing cycle is a scanning cycle of said laser sensor.

7. A method of controlling a robot tool to perform a weaving action, said method comprising the steps of:

determining a first position of a robot in a robot coordinate system set while said robot is in a weaving cycle based on non-contact sensor detection data taken at a sensing cycle and a first weaving amount, said first weaving amount determined in accordance with a frequency f of said first weaving amount, an amplitude Dw of said first weaving amount and, said sensing cycle being an integer multiple of said weaving cycle, and said weaving and sensing cycles being synchronized;

obtaining a target point of movement in said robot coordinate system based on a second weaving amount determined in accordance with frequency f of said second weaving amount, an amplitude Dw of said second weaving amount and said first position obtained in the first position determining step; and moving the robot toward said target point obtained in the target point obtaining step based upon the said first position and said weaving amount.

8. A robot control device, comprising:

a non-contact sensor successively obtaining detection data of a robot in a robot coordinate system during a scanning action cycle while said robot is executing a weaving welding action cycle, said weaving action cycle and said sensing action cycle being synchronized and said sensing action cycle being an integer multiple of said weaving action cycle; and a robot controller operatively connected to said non-contact sensor, determining a first weaving amount based on the detection data and a frequency f of said first weaving amount, an amplitude Dw of said first weaving amount and, determining a position of the robot based on the detection data and the first weaving amount and determining a second weaving amount based on a frequency f of said second weaving amount, an amplitude Dw of said second weaving amount and the difference between said position and a target position, whereby using said detection data and said first weaving amount the position of a welding tool can be accurately determined during said weaving welding cycle and the second weaving amount can be determined to move said welding tool to said target position.

* * * * *